(12) United States Patent
Chou

(10) Patent No.: US 9,279,967 B2
(45) Date of Patent: Mar. 8, 2016

(54) ZOOM LENS

(75) Inventor: Hsiang-Ho Chou, Taipei (TW)

(73) Assignee: ABILITY ENTERPRISE CO., LTD., Taipei (TW)

(*) Notice: Subject to any disclaimer, the term of this patent is extended or adjusted under 35 U.S.C. 154(b) by 1037 days.

(21) Appl. No.: 13/414,257

(22) Filed: Mar. 7, 2012

(65) Prior Publication Data

US 2012/0307378 A1  Dec. 6, 2012

(30) Foreign Application Priority Data

Jun. 3, 2011 (TW) .............................. 100119682 A

(51) Int. Cl.
  *G02B 15/14*  (2006.01)
  *G02B 15/177*  (2006.01)

(52) U.S. Cl.
  CPC .................................. *G02B 15/177* (2013.01)

(58) Field of Classification Search
  CPC ...... G02B 15/14; G02B 15/16; G02B 15/163; G02B 15/177
  USPC .......................................... 351/689, 680–682
  See application file for complete search history.

(56) References Cited

U.S. PATENT DOCUMENTS

| | | | |
|---|---|---|---|
| 6,839,183 B2 | 1/2005 | Ohashi | |
| 6,909,846 B2 | 6/2005 | Suzuki | |
| 7,075,734 B2 | 7/2006 | Suzuki | |
| 7,177,095 B2 | 2/2007 | Sugiyama et al. | |
| 7,457,050 B2 * | 11/2008 | Betensky | ..................... 359/691 |
| 7,742,236 B2 | 6/2010 | Ohata | |
| 2003/0123156 A1 | 7/2003 | Minefuji | |
| 2005/0213223 A1 | 9/2005 | Noda | |
| 2006/0083504 A1 * | 4/2006 | Matsusaka | ........... G02B 15/177 396/72 |
| 2007/0115558 A1 * | 5/2007 | Ito | ................................ 359/680 |
| 2010/0128363 A1 * | 5/2010 | Yamano | ............... G02B 15/177 359/689 |

FOREIGN PATENT DOCUMENTS

| | | |
|---|---|---|
| CN | 1576940 A | 2/2005 |
| CN | 1658002 A | 8/2005 |
| CN | 1673796 A | 9/2005 |
| CN | 1885087 A | 12/2006 |
| EP | 1498758 A1 | 1/2005 |
| EP | 1566680 A1 | 8/2005 |
| JP | 2002-350726 A | 12/2002 |
| JP | 2003-140041 A | 5/2003 |
| TW | 200515004 A | 5/2005 |
| TW | 200532240 A | 10/2005 |
| TW | 200540453 A | 12/2005 |
| TW | 200732823 | 9/2007 |

OTHER PUBLICATIONS

Office Action issued by State Intellectual Property Office of the People's Republic of China on Jun. 4, 2014.

* cited by examiner

Primary Examiner — Scott J Sugarman
(74) Attorney, Agent, or Firm — Rabin & Berdo, P.C.

(57) ABSTRACT

An embodiment of this invention provides a zoom lens, which primarily comprises, in order from an object side to an image-forming side, a first lens group having negative refractive power; a second lens group having positive refractive power; and a third lens group having positive refractive power. The second lens group includes a plurality lenses in which the refractive index of the lens nearest to the object side is NDo, the refractive index of the lens nearest to the image-forming side is NDi, and NDo and NDi satisfy: NDi−NDo>0.1.

21 Claims, 8 Drawing Sheets

ZOOM LENS

CROSS-REFERENCE TO RELATED APPLICATIONS

The entire contents of Taiwan Patent Application No. 100119682, filed on Jun. 3, 2011, from which this application claims priority, are incorporated herein by reference.

BACKGROUND OF THE INVENTION

1. Field of the Invention

The present invention relates to zoom lenses, especially to zoom lenses with low cost, high zoom ratio, small size, and good image quality.

2. Description of Related Art

Image-capturing devices, such as digital cameras or digital camcorders, employ a zoom lens and an image sensor to collect an image beam of an object, in which the zoom lens focuses the image beam on the image sensor, which then turns the image beam into digital signals for following processing, transmitting, and storage.

Typically, the zoom lens of the image-capturing devices consists of three to six lens groups. A zoom lens with less lens groups typically has lower cost and little dimension, but, on the other hand, it also suffers from low zoom ratio.

Therefore, it would be advantageous to provide a novel zoom lens having advantage of low cost, compact size, high zoom ratio, and good image quality.

SUMMARY OF THE INVENTION

An object of the present invention is to provide novel zoom lenses having advantages of compact size, high zoom ratio, and good image quality under a low cost condition.

An embodiment of this invention provides a zoom lens that primarily comprises, in order from an object side to an image-forming side, a first lens group having negative refractive power, a second lens group having positive refractive power, and a third lens group having positive refractive power. The second lens group comprises several lenses, wherein the first lens from the object side has a refractive index NDo, the first lens from the image-forming side has a refractive index NDi, and NDi and NDo satisfy: NDi−NDo>0.

By the features described above, the zoom lenses of this invention have higher zoom ratio and better image quality than conventional ones under the low cost and compact size condition.

DESCRIPTION OF THE PREFERRED EMBODIMENT

Figure 1:
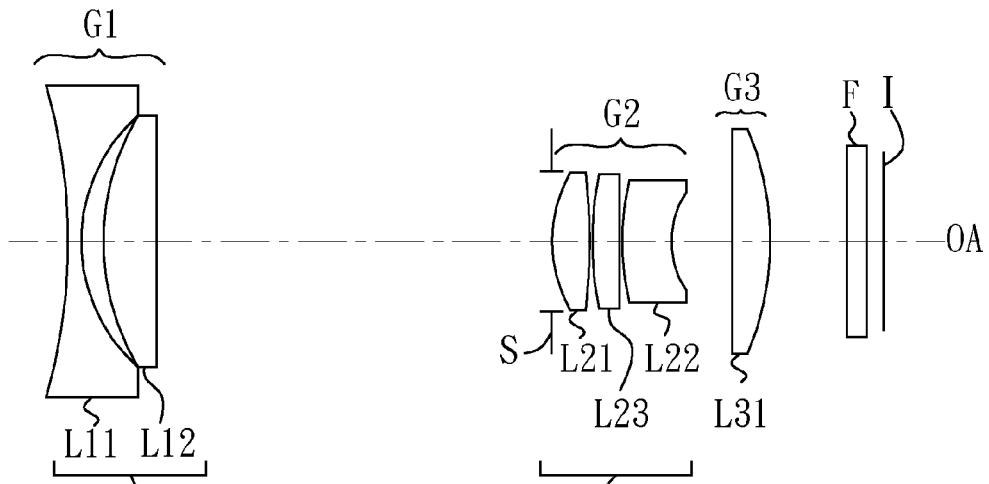
FIG. 1 shows a zoom lens ZL at the wide-angle end and the telephoto end, according to a first embodiment of this invention.
Figure 1:
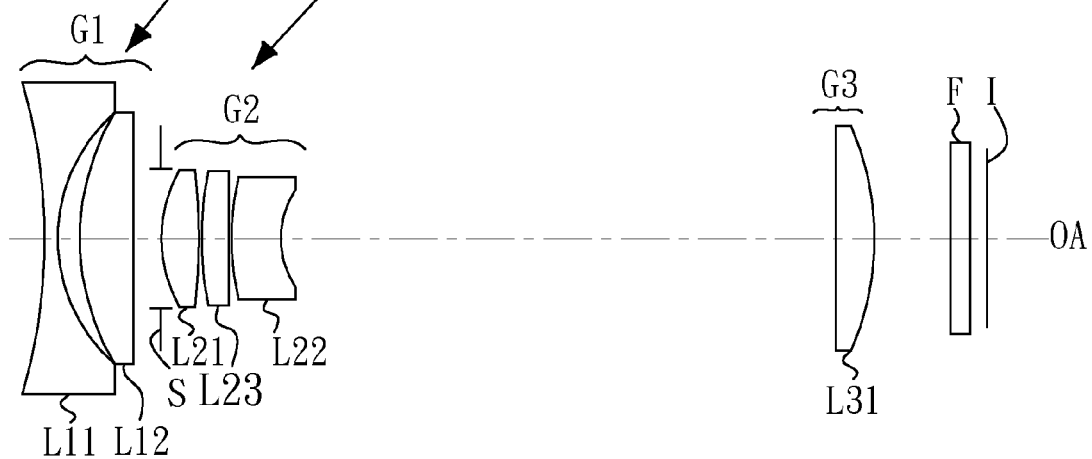

Reference will now be made in detail to specific embodiments of the invention. Examples of these embodiments are illustrated in accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known components and process operations have not been described in detail in order not to unnecessarily obscure the present invention. While drawings are illustrated in detail, it is appreciated that the quantity of the disclosed components may be greater or less than that disclosed, except where expressly restricting the amount of the components.

For needs of compact size, low cost, high zoom ratio, and good image quality, embodiments of this invention provide zoom lenses comprising, in order from an object side to an image-forming side, a first lens group having negative refractive power, a second lens group having positive refractive power, and a third lens group having positive refractive power. Each lens group includes at least one lens, and preferably, the first lens group and the second lens group are moved along an optical axial for determining a zoom ratio of the zoom lens.

In addition, the second lens group comprises several lenses, in which the first lens from the object side (i.e., the lens nearest to the object side) has a refractive index NDo, the first lens from the image-forming side (i.e., the lens nearest to the image-forming side) has a refractive index NDi, and NDi and NDo satisfy: NDi−NDo>0.

In addition, preferably, the first lens group comprises several lenses, in which an object surface of the first lens group has a negative radius of curvature. Notice that in this context, the term "object surface" refers to a surface nearest to the object side, i.e., the first surface from the object side. For example, the first lens group comprises several lenses in which the first lens from the object side has a surface toward the object side, and the surface has a negative curvature radius, i.e., negative radius of curvature.

In addition, for lenses of the second lens group, preferably, the first lens from the object side (i.e., the lens nearest to the object side) has an Abbe number VDo, the first lens from the image-forming side (i.e., the lens nearest to the image-forming side) has an Abbe number VDi, and VDi and VDo satisfy: VDo−VDi>29.

In addition, the zoom ratio has a maximum value ft/fw satisfying the following condition: $4.0 < ft/fw < 7.0$, and preferably $5.0 < ft/fw < 7.0$, where fw denotes the focal length of the zoom lens at the wide-angle end, and ft denotes the focal length of the zoom lens at the telephoto end.

In addition, the zoom lenses further satisfy the following conditions: 1.0<|fG1/fG2|, where fG1 denotes the focal length of the first lens group, and fG2 denotes the focal length of the second lens group.

In addition, all lens groups are moved along the optical axis for altering the zoom ratio (i.e., zooming) and the focal length of the zoom lens. In detail, when zooming from the wide-angle end to the telephoto end, the first lens group and the second lens group may be moved toward the object side. The first lens group may be firstly moved toward the image-forming side, and then moved toward the object side. The second lens group may be moved straightforwardly toward the object side. The third lens group may be slightly moved for adjusting the shift of the focal length of the zoom lens.

In addition, each lens group comprises at least one aspheric lens or free-form lens made of a plastic or a glass. The plastic may comprise, but is not limited to, polycarbonate, cyclic olefin copolymer (e.g. APEL), polyester resins (e.g. OKP4 or OKP4HT), and the like. A polish or a glass molding process (GMP), using an optical grade glass material, may be used to fabricate the glass lenses, and an injection molding process, using a polymer as the material, may be used to fabricate the plastic lenses.

In addition, at least one surface of each free-form lens is a free-form freedom surface, and at least one surface of each aspheric lens is an aspheric surface satisfying the following equation:

$$Z = \frac{CY^2}{1+\sqrt{1-(K+1)C^2Y^2}} + A_4Y^4 + A_6Y^6 + A_8Y^8 + A_{10}Y^{10} + A_{12}Y^{12},$$

where Z is the coordinate in the optical axis direction in which direction light propagates as positive, $A_4, A_6, A_8, A_{10}$, and $A_{12}$ are aspheric coefficients, K is coefficient of quadratic surface, R is the radius of curvature, C is reciprocal of R (C=1/R), Y is the coordinate in a direction perpendicular to the optical axis in which the upward direction is positive, and coefficients of the above equation of each aspheric lens are predetermined to determine the focal length.

The zoom lenses of embodiments may be employed in an image-capturing or an image-projecting device, such as a digital camera, a digital camcorder, a cellular phone, or a projector.

Three particular embodiments are illustrated as follows.

FIG. 1 shows a zoom lens ZL at the wide-angle end and at the telephoto end, according to a first embodiment of this invention. In this embodiment, the zoom lens ZL primarily consists, in order from an object side to an image-forming side, of a first lens group G1 having negative refractive power, a second lens group G2 having positive refractive power, and a third lens group G3 having positive refractive power. The three lens groups are arranged along an optical axis OA, and an image-forming surface I is arranged at the image-forming side.

In addition, the zoom lens ZL may further comprise a stop S and a filter F. The stop S may be arranged between the first lens group G1 and the second lens group G2, for limiting the light flux of the image beam into the second lens group G2. The filter F may be arranged between the third lens group G3 and the image-forming surface I, for filtering invisible light off the image beam. The filter F may be an infrared light filter. The image-forming surface I denotes an image-capturing component, for receiving image beam passing through the filter F and converting light analog signal to electrical digital signal.

In this embodiment, in order from the object side to the image-forming side, the first lens group G1 comprises a first lens L11 having negative refractive power, and a second lens L12 having positive refractive power; the second lens group G2 comprises a first lens L21 having positive refractive power, a third lens L23 having positive refractive power, and a second lens L22 having negative refractive power; the third lens group G3 comprises a first lens L31 having positive refractive power. Modifications may be made to the above-mentioned structures.

Further, the second lens L12 of the first lens group G1, the first lens L21 and the second lens L22 of the second group G2, and the first lens L31 of the third lens group G3 may be an aspheric lens with two aspheric surfaces, a free-form lens with two free-form freedom surfaces, or a lens with one aspheric surface and one free-form freedom surface, and other lenses of the zoom lens may be glass or plastic spherical lenses with two spherical surfaces.

In this embodiment, the second lens L12, the second lens L22, and the first lens L31 are plastic lenses, and other lenses are glass lenses. In practice, the first lens L21 may be made of glass by using the glass molding process.

Table 1 lists the detail information of the zoom lens ZL shown in FIG. 1, according to an example of this invention. The information includes the curvature radius, the thickness, the refractive index, and the Abbe number of lenses or every surface of lenses in the zoom lens, where the surface numbers are sequentially ordered from the object side to the image-forming side. For example, "S1" stands for the surface of the first lens L11 facing the object side, "S2" stands for the surface of the first lens L11 facing the image-forming side, "S3" stands for the surface of the second lens facing the object side, "S" stands for the stop, and so on.

TABLE 1

| lens No. | Surface No. | curvature radius (mm) | thickness (mm) | refractive index | Abbe no. |
|---|---|---|---|---|---|
| L11 | S1 | −52.3911 | 0.65 | 1.7292 | 54.68 |
|  | S2 | 6.9554 | 1.3306 |  |  |
| L12 | S3 | 11.2644 | 2.0605 | 1.636 | 23.96 |
|  | S4 | 33.7429 | D1 |  |  |
|  | S | ∞ | 0.6 |  |  |
| L21 | S5 | 5.4808 | 1.8569 | 1.49712 | 81.56 |
|  | S6 | −18.5816 | 0.1067 |  |  |
| L23 | S7 | 39.1925 | 1.3166 | 1.87352 | 41.3221 |
|  | S8 | −100 | 0.1 |  |  |
| L22 | S09 | 10.83915 | 2.2576 | 1.6360 | 23.96 |
|  | S10 | 3.7368 | D2 |  |  |
| L31 | S11 | 150 | 1.9777 | 1.5440 | 56.11 |
|  | S12 | −9.1544 | D3 |  |  |
| F | S13 | ∞ | 0.8 | 1.5163 | 64.142 |
|  | S14 | ∞ | 0.8 |  |  |
| I |  | ∞ | 0 |  |  |

In Table 1, the "thickness" stands for the distance between the indicated surface and the next. For example, the thickness of the surface S1 is the distance between the surface S1 and the surface S2, and the thickness of the surface S2 is the distance between the surface S2 and the surface S3. In addition, the thickness labeled with D1, D2, or D3 indicates that the thickness is a variable depending on the wide-angle end or the telephoto end, and Table 2 lists the detail.

TABLE 2

| thickness | Wide-angle end (mm) | Telephoto end (mm) |
|---|---|---|
| D1 | 16.42488 | 0.70448 |
| D2 | 1.789365 | 25.99889 |
| D3 | 3.629674 | 2.44 |

In addition, Table 3 lists the focal length f, the aperture FNO (F number), the half angle view ω, the image height Y, and the total length TL of the zoom lens listed in Table 1.

TABLE 3

| Parameters | Wide-angle end | Telephoto end |
|---|---|---|
| F (mm) | 4.6 | 26.5 |
| FNO | 3.5 | 6.6 |
| ω(°) | 43.24 | 8.69 |
| Y (mm) | 3.5 | 3.875 |
| TL (mm) | 34.9 | 42.2 |

Furthermore, in this example listed in Table 1, the surfaces S3, S4, S5, S6, S9, S10, S11, and S12 are aspheric surfaces. The aspheric coefficients of the aspheric surfaces are listed in Table 4.

TABLE 4

| | K | $A_4$ | $A_6$ | $A_8$ | $A_{10}$ | $A_{12}$ |
|---|---|---|---|---|---|---|
| S3 | 0 | −0.000243 | 7.71E−06 | −1.43E−06 | 7.89E−08 | −1.04E−09 |
| S4 | 0 | −0.00052☐ | 8.26E−06 | −1.48E−06 | 8.54E−08 | −1.34E−09 |
| S5 | 0 | −0.000581 | −1.79E−05 | −3.86E−07 | 2.25E−08 | 0 |
| S6 | 0 | 0.000241 | −1.96E−05 | 7.12E−07 | −1.83E−08 | 0 |
| S09 | 0 | −0.001104 | −1.77E−05 | 7.80E−06 | −1.32E−06 | 5.9E−08 |
| S10 | 0 | −0.001465 | −8.95E−05 | 6.55E−05 | −1.62E−05 | 1.2E−06 |
| S11 | 0 | 1.09E−04 | 4.17E−05 | −2.28E−06 | 3.87E−08 | 0 |
| S12 | 0 | 0.000699 | 3.10E−05 | −2.20E−06 | 3.95E−08 | 0 |

Figure 2A:
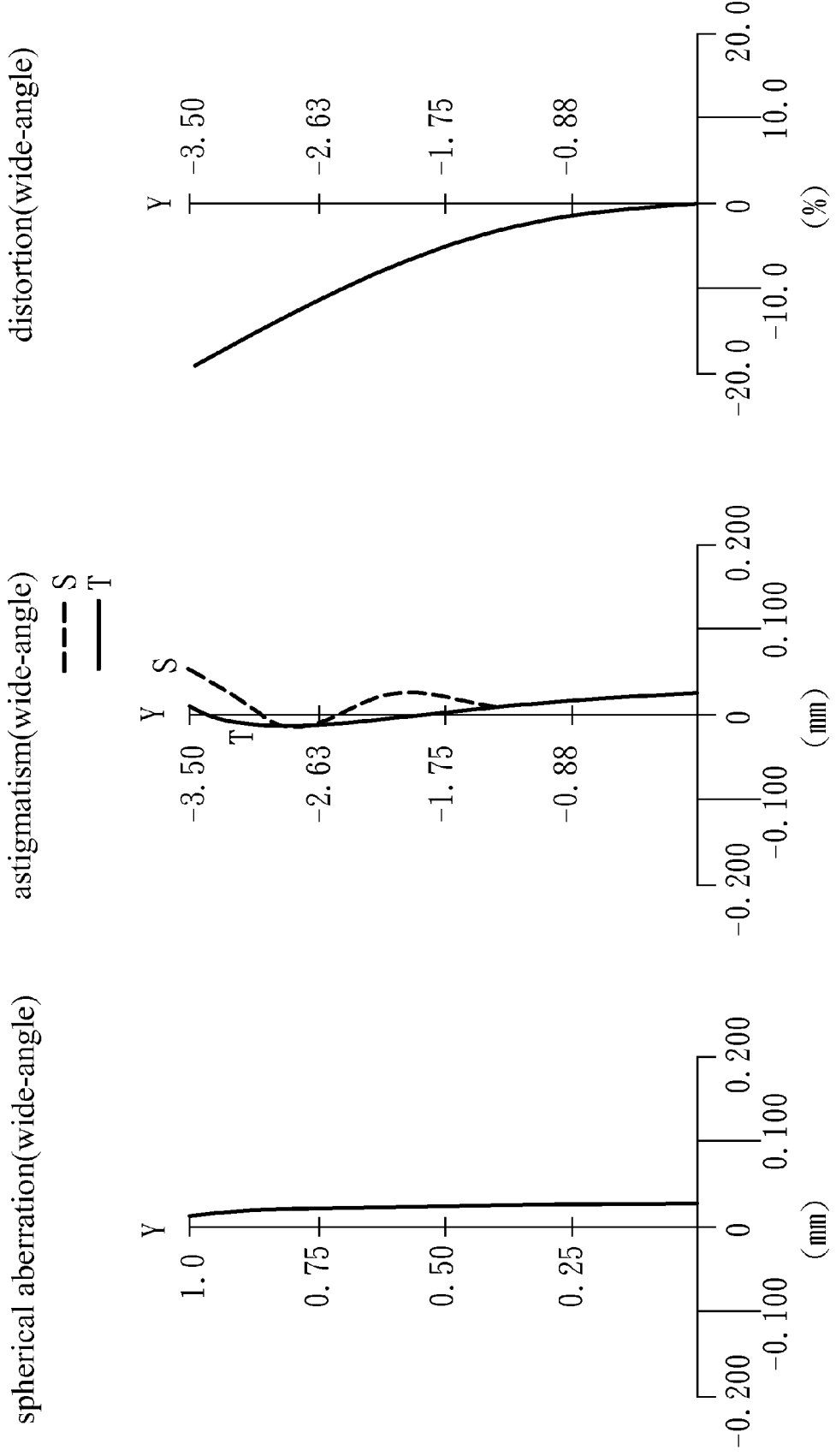
FIGS. 2A and 2B respectively show the longitudinal spherical aberration chart, the astigmatism chart, and the distortion chart of the zoom lens at the wide-angle end and the telephoto end, according to an example of the first embodiment of this invention.
Figure 2B:
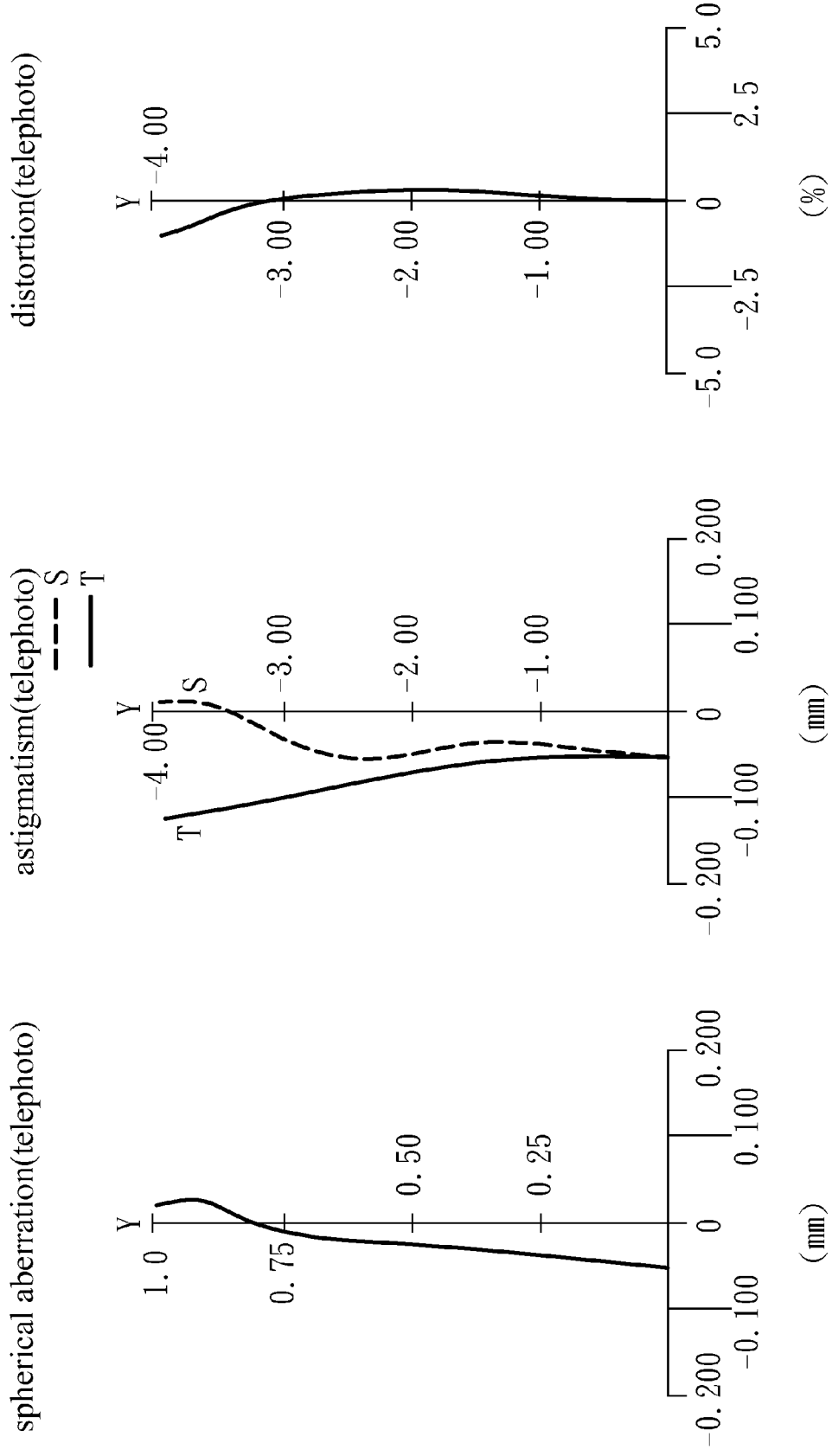

FIGS. 2A and 2B show the optical aberration of the zoom lens shown in Table 1, at the wide-angle end and the telephoto end respectively. The optical aberration performances are measured by an image beam with wavelength 587 nm and include the longitudinal spherical aberration chart, the astigmatism chart, and the distortion chart of the zoom lens. Where curve T and S stand for the aberration of the zoom lens to the tangential rays and the sagittal rays for the image beam.

The charts show that: the spherical aberration is less than 0.2 mm at the wide-angle end; the spherical aberration is less than 0.2 mm at the telephoto end; S (i.e. tangential value) and T (i.e. sagittal value) are within the range of −0.2 mm to 0.2 mm at the wide-angle end; S and T are within the range of −0.2 mm to 0.2 mm at the telephoto end; the distortion is within range of −20% to 0% at the wide-angle end; and the distortion is within range of −2% to 2% at the telephoto end.

Figure 3:
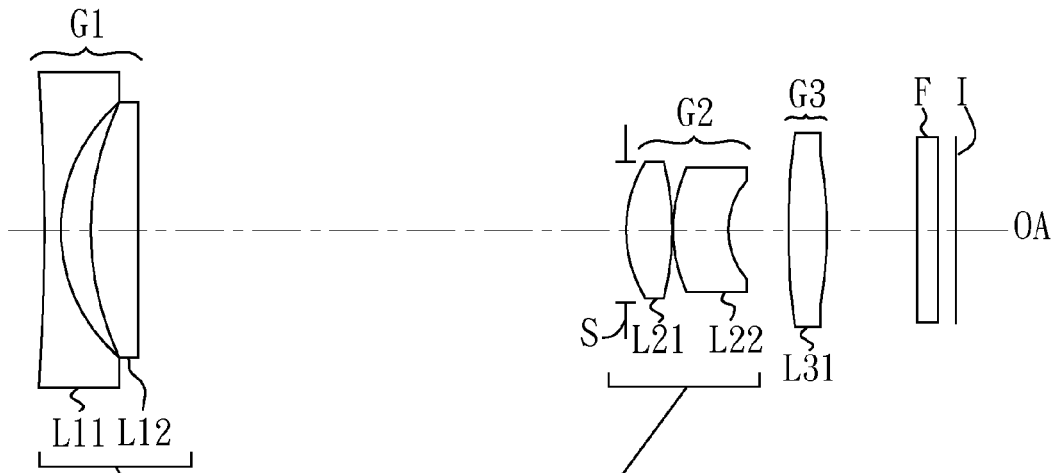
FIG. 3 shows a zoom lens ZL at the wide-angle end and the telephoto end, according to a second embodiment and a third embodiment of this invention.
Figure 3:
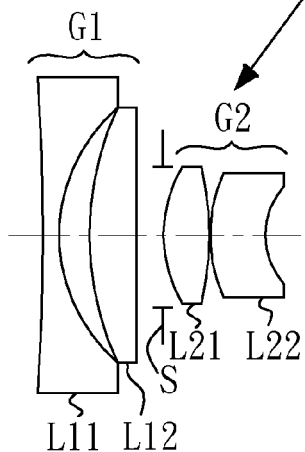

FIG. 3 shows a zoom lens ZL at the wide-angle end and at the telephoto end, according to a second embodiment of this invention. The zoom lens ZL of this embodiment has structures similar to the first embodiment, and the difference is: this embodiment omits the third lens L23 of the second lens group G2. Although one lens is omitted, the objective of high zoom ratio and good image quality are still achieved under the low cost and compact size conditions. Except the lens L23, the description for the first embodiment can be used in this embodiment, and it is omitted for simplicity.

In this preferred embodiment, the second lens L12 of the first lens group the first lens L21 and the second lens L22 of the second group G2, and the first lens L31 of the third lens group G3 may be an aspheric lens with two aspheric surfaces, a free-form lens with two free-form freedom surfaces, or a lens with one aspheric surface and one free-form freedom surface, and other lenses of the zoom lens may be glass or plastic spherical lenses with two spherical surfaces. In this embodiment, the second lens L12, the second lens L22, and the first lens L31 are plastic lenses, and other lenses are glass lenses. In practice, the first lens L21 may be made of glass by using the glass molding process.

Table 5 lists the detail information of the zoom lens ZL of the second embodiment. The surface numbers are ordered by the above-mentioned rule as in Table 1.

TABLE 5

| lens No. | Surface No. | curvature radius (mm) | thickness (mm) | refractive index | Abbe no. |
|---|---|---|---|---|---|
| L11 | S1 | −97.3280 | 0.6 | 1.7292 | 54.68 |
| | S2 | 7.4995 | 1.5842 | | |
| L12 | S3 | 13.8763 | 1.9676 | 1.636 | 23.96 |
| | S4 | 43.5758 | D1 | | |
| | S | ∞ | 0.6 | | |

TABLE 5-continued

| lens No. | Surface No. | curvature radius (mm) | thickness (mm) | refractive index | Abbe no. |
|---|---|---|---|---|---|
| L21 | S5 | 5.4516 | 2.0128 | 1.4971 | 81.56 |
| | S6 | −12.2674 | 0.1 | | |
| L22 | S7 | 8.8341 | 2.4140 | 1.636 | 23.96 |
| | S8 | 3.8045 | D2 | | |
| L31 | S09 | 96.5701 | 1.7 | 1.5441 | 56.11 |
| | S10 | −14.1829 | D3 | | |
| F | S11 | ∞ | 0.8 | 1.5163 | 64.142 |
| | S12 | ∞ | 0.8 | | |
| I | | | 0 | | |

In Table 5, the "thickness" stands for the distance between the indicated surface and the next. The thickness labeled with D1, D2, or D3 indicates that the thickness is a variable depending on the wide-angle end or the telephoto end, and Table 6 lists the detail.

TABLE 6

| thickness | Wide-angle end (mm) | Telephoto end (mm) |
|---|---|---|
| D1 | 21.340 | 0.675 |
| D2 | 2.734 | 25.764 |
| D3 | 4.134 | 2.4 |

Additionally, Table 7 lists the focal length f, the aperture FNO (F number), the half angle view ω, the image height Y, and the total length TL of the zoom lens listed in Table 5.

TABLE 7

| Parameters | Wide-angle end | Telephoto end |
|---|---|---|
| F (mm) | 4.6781 | 27.204 |
| FNO | 3.6 | 6.6 |
| ω(°) | 42.39 | 8.14 |
| Y (mm) | 3.4 | 3.875 |
| TL (mm) | 40.786 | 41.4177 |

Furthermore, in this example listed in Table 5, the surfaces S3, S4, S5, S6, S7, S8, S9, and S10 are aspheric surfaces. The aspheric coefficients of the aspheric surfaces are listed in Table 8.

TABLE 8

|  | K | $A_4$ | $A_6$ | $A_8$ | $A_{10}$ | $A_{12}$ |
|---|---|---|---|---|---|---|
| S3 | 0 | −0.00035 | 2.52877E−06 | 4.02E−07 | −7.2E−09 | 6.08E−11 |
| S4 | 0 | −0.0006 | 1.44808E−05 | −3E−07 | 9.48E−09 | −1.4E−10 |
| S5 | 0 | −0.00061 | −2.05785E−05 | −4.7E−07 | 1.46E−08 | 0 |
| S6 | 0 | 0.00061 | −3.41421E−05 | 2.97E−06 | −1.5E−07 | 0 |
| S07 | 0 | −0.00046 | 1.4453E−06 | 6.68E−06 | −5.3E−07 | 0 |
| S08 | 0 | −0.00099 | 2.70697E−05 | 2.59E−05 | −3.4E−06 | 0 |
| S09 | 0 | 8.96E−05 | 3.74047E−05 | −3.4E−07 | −7.5E−09 | 0 |
| S10 | 0 | 0.000376 | 1.99332E−05 | 8.52E−07 | −3.7E−08 | 0 |

Figure 4A:
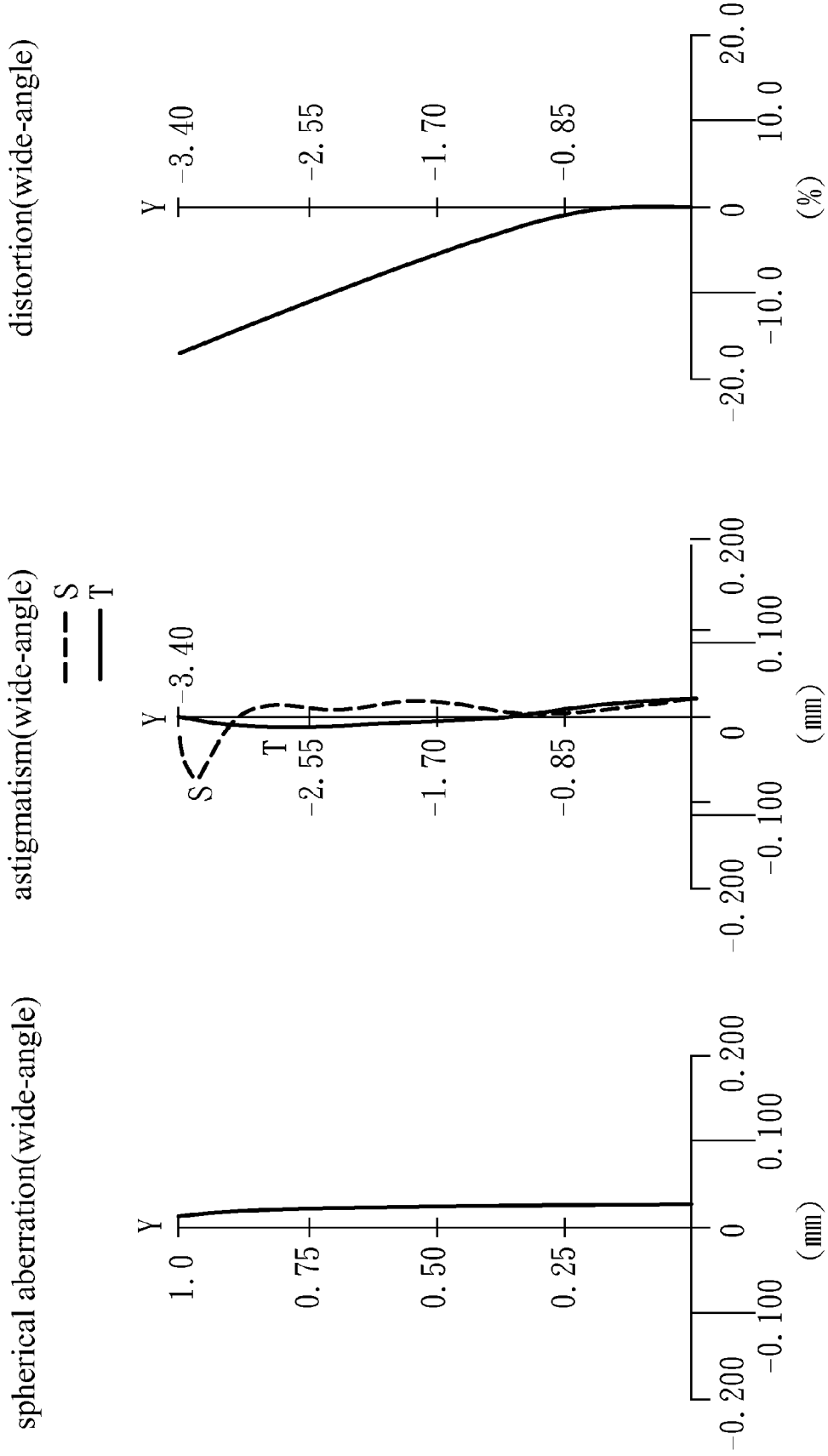
FIGS. 4A and 4B respectively show the longitudinal spherical aberration chart, the astigmatism chart, and the distortion chart of the zoom lens at the wide-angle end and the telephoto end, according to an example of the second embodiment of this invention.
Figure 4B:
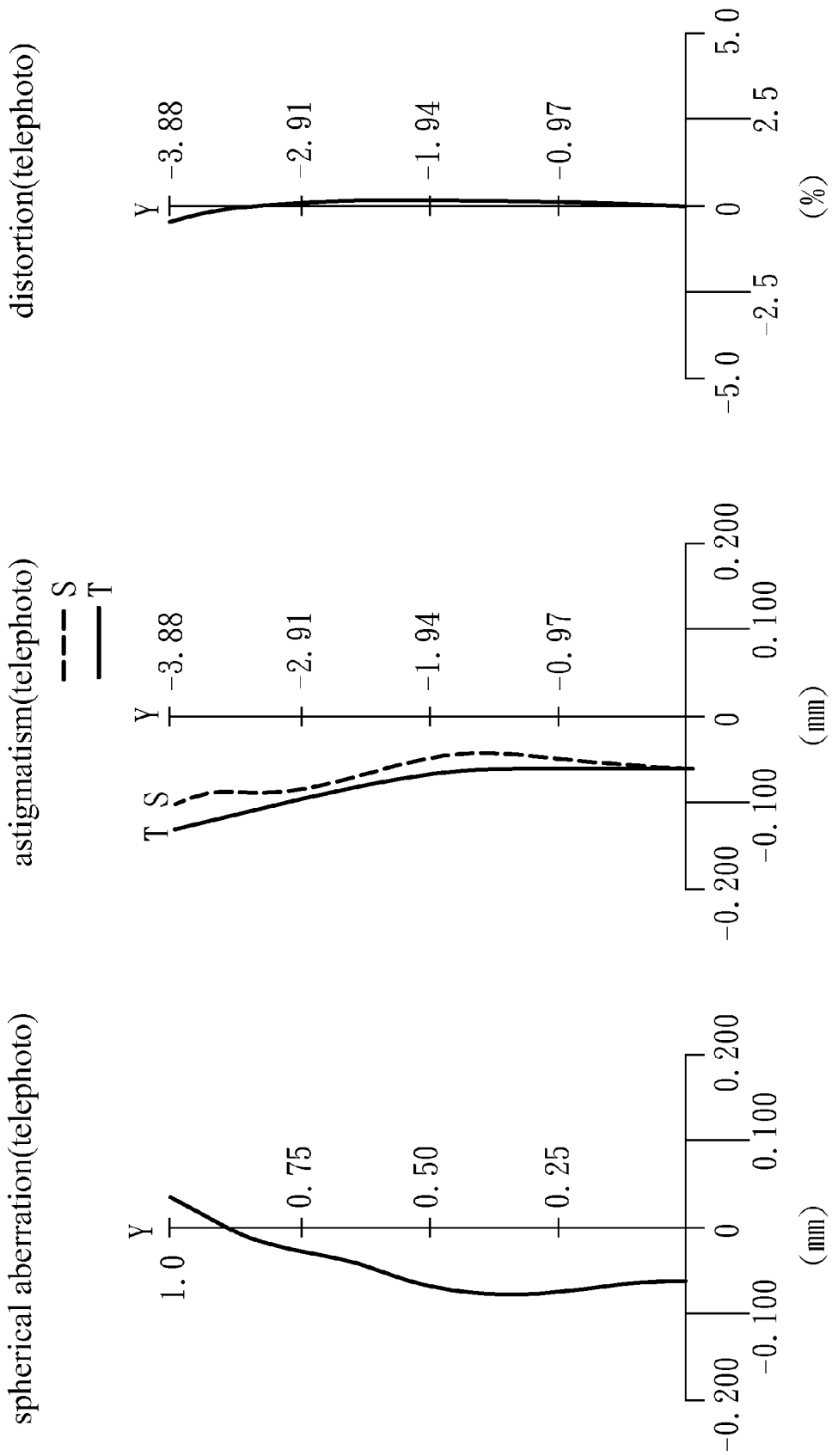

FIGS. 4A and 4B show the optical aberration of the zoom lens shown in Table 5, at the wide-angle end and the telephoto end respectively. The optical aberration performances are measured by an image beam with wavelength 587 nm and include the longitudinal spherical aberration chart, the astigmatism chart, and the distortion chart of the zoom lens. Where curve T and S stand for the aberration of the zoom lens to the tangential rays and the sagittal rays for the image beam.

The charts show that: the spherical aberration is less than 0.2 mm at the wide-angle end; the spherical aberration is less than 0.2 mm at the telephoto end; S (i.e. tangential value) and T (i.e. sagittal value) are within the range of −0.2 mm to 0.2 mm at the wide-angle end; S and T are within the range of −0.2 mm to 0.2 mm at the telephoto end; the distortion is within range of −20% to 0% at the wide-angle end; and the distortion is within range of −1% to 1% at the telephoto end.

Moreover, this invention provides a third embodiment having a structure similar to the second embodiment shown in FIG. 3. The difference between the two embodiments is the detail of the lenses and will be described as follows. The other description of this embodiment is the same as the second embodiment and thus omitted for simplicity.

Table 9 lists the detail information of the zoom lens ZL of the third embodiment. The surface numbers are ordered by the above-mentioned rule as in Table 1.

TABLE 9

| lens No. | Surface No. | curvature radius (mm) | thickness (mm) | refractive index | Abbe no. |
|---|---|---|---|---|---|
| L11 | S1 | −132.9764 | 0.65 | 1.7292 | 54.68 |
|  | S2 | 6.1973 | 1.5686 |  |  |
| L12 | S3 | 12.4608 | 1.8620 | 1.636 | 23.96 |
|  | S4 | 40.5466 | D1 |  |  |
|  | S | 1.00E+18 | 0.5 |  |  |
| L21 | S5 | 4.6589 | 1.6803 | 1.4971 | 81.56 |
|  | S6 | −10.6252 | 0.07 |  |  |
| L22 | S7 | 6.4201 | 1.6391 | 1.636 | 23.96 |
|  | S8 | 3.0809 | D2 |  |  |
| L31 | S09 | 100 | 1.2338 | 1.5441 | 56.11 |
|  | S10 | −13.4595 | D3 |  |  |
| F | S11 | 1.00E+18 | 0.8 | 1.5163 | 64.142 |
|  | S12 | 1.00E+18 | 0.8 |  |  |
| I |  | 1E+18 | 0 |  |  |

In Table 9, the "thickness" stands for the distance between the indicated surface and the next. The thickness labeled with D1, D2, or D3 indicates that the thickness is a variable depending on the wide-angle end or the telephoto end, and Table 10 lists the detail.

TABLE 10

| thickness | Wide-angle end (mm) | Telephoto end (mm) |
|---|---|---|
| D1 | 15.1608 | 0.6773 |
| D2 | 2.7052 | 22.2725 |
| D3 | 4.2822 | 2.3 |

Table 11 lists the focal length f, the aperture FNO (F number), the half angle view ω, the image height Y, and the total length TL of the zoom lens listed in Table 9.

TABLE 11

| Parameters | Wide-angle end | Telephoto end |
|---|---|---|
| F (mm) | 4.6 | 22.083 |
| FNO | 3.55 | 6.6 |
| ω(°) | 42.56 | 9.96 |
| Y (mm) | 3.5 | 3.875 |
| TL (mm) | 32.95 | 36.05 |

Furthermore, in this example listed in Table 9, the surfaces S3, S4, S5, S6, S7, S8, S9, and S10 are aspheric surfaces. The aspheric coefficients of the aspheric surfaces are listed in Table 12.

TABLE 12

|     | K | $A_4$ | $A_6$ | $A_8$ | $A_{10}$ | $A_{12}$ |
| --- | --- | --- | --- | --- | --- | --- |
| S3  | 0 | −0.00018   | −1.22E−05 | 1.56E−06  | −4.02E−08 | 6.81E−10 |
| S4  | 0 | −0.000604  | 3.73E−06  | 2.58E−07  | 4.66E−09  | −2.44E−10 |
| S5  | 0 | −0.001182  | −6.17E−05 | −8.55E−07 | −9.00E−08 | 0 |
| S6  | 0 | 0.001091   | −9.58E−05 | 3.50E−06  | −2.68E−07 | 0 |
| S07 | 0 | −0.000722  | 2.71E−05  | 1.13E−05  | −1.95E−06 | 0 |
| S08 | 0 | −0.002379  | −6.90E−05 | 9.12E−05  | −1.97E−05 | 0 |
| S09 | 0 | 4.37E−04   | 4.50E−05  | −2.87E−07 | −3.40E−08 | 0 |
| S10 | 0 | 0.000827   | 3.29E−05  | 4.58E−07  | −6.33E−08 | 0 |

Figure 5A:
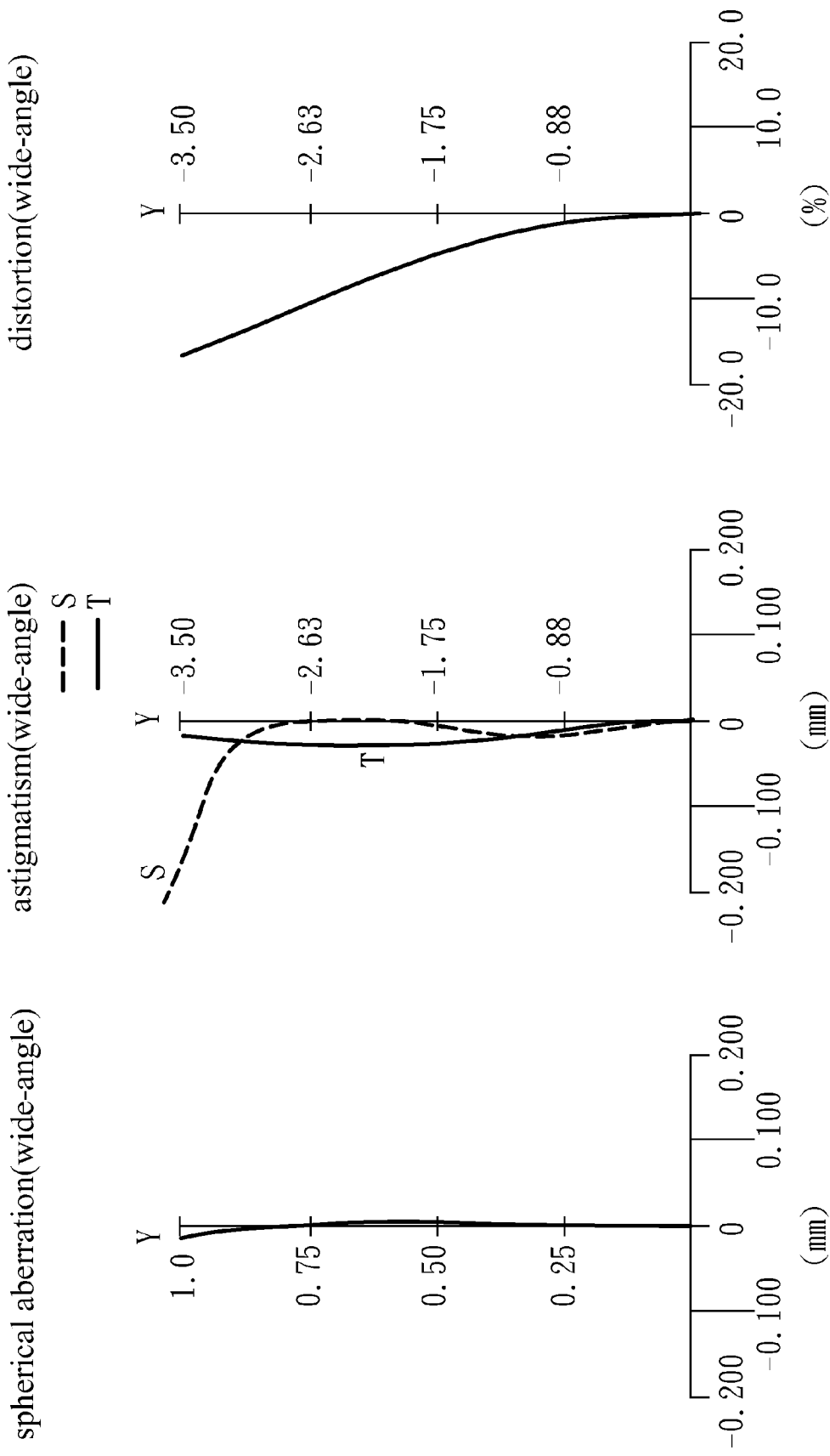
FIGS. 5A and 5B respectively show the longitudinal spherical aberration chart, the astigmatism chart, and the distortion chart of the zoom lens at the wide-angle end and the telephoto end, according to an example of the third embodiment of this invention.
Figure 5B:
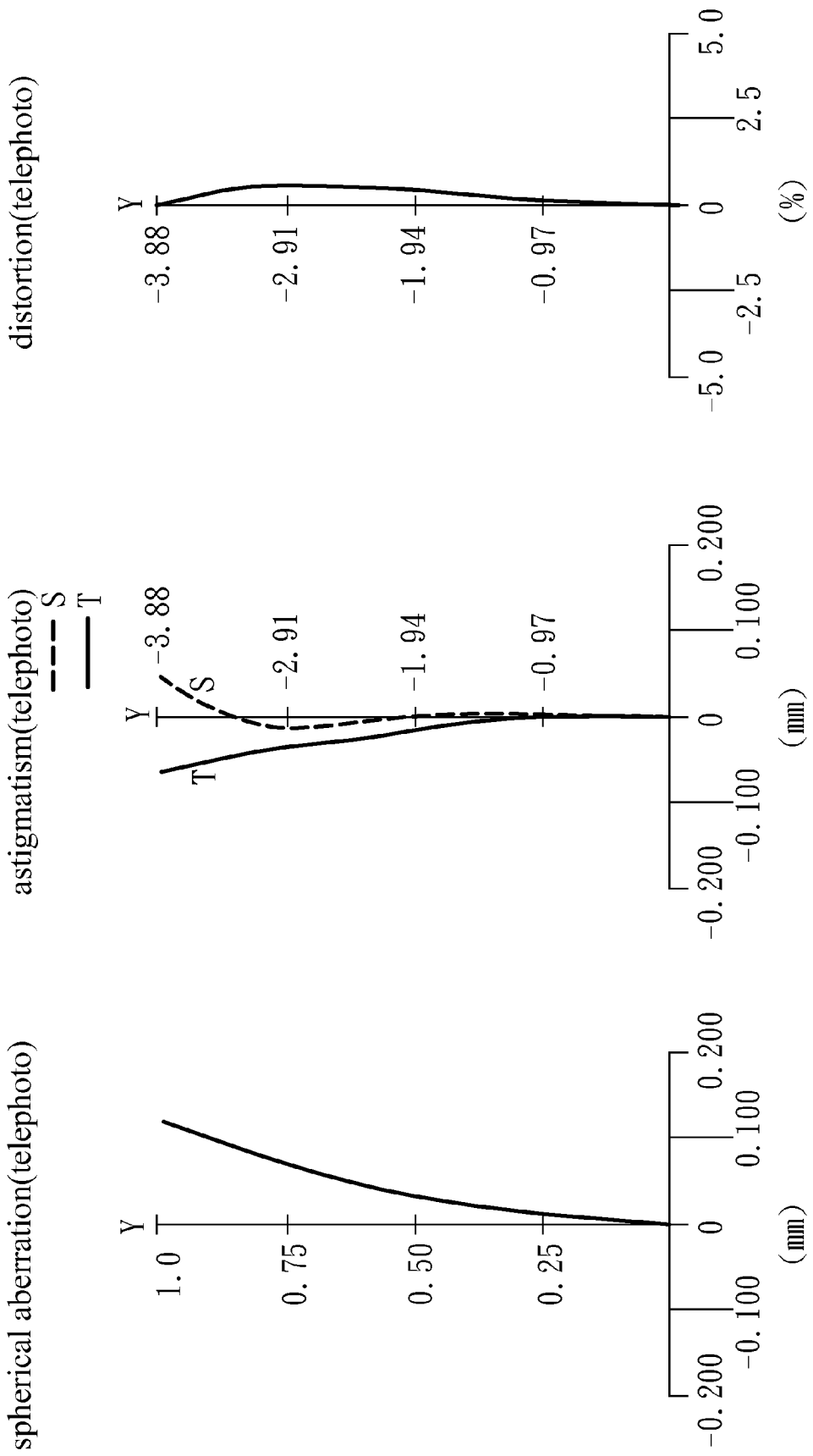

FIGS. 5A and 5B show the optical aberration of the zoom lens shown in Table 9, at the wide-angle end and the telephoto end respectively. The optical aberration performances are measured by an image beam with wavelength 587 nm and include the longitudinal spherical aberration chart, the astigmatism chart, and the distortion chart of the zoom lens. Where curve T and S stand for the aberration of the zoom lens to the tangential rays and the sagittal rays for the image beam.

The charts show that: the spherical aberration is less than 0.2 mm at the wide-angle end; the spherical aberration is less than 0.2 mm at the telephoto end; S (i.e. tangential value) and T (i.e. sagittal value) are within the range of −0.2 mm to 0.2 mm at the wide-angle end; S and T are within the range of −0.2 mm to 0.2 mm at the telephoto end; the distortion is within range of −20% to 0% at the wide-angle end; and the distortion is within range of −1% to 1% at the telephoto end.

Accordingly, this invention provides zoom lenses appearing little aberration in the spherical aberration, astigmatism, and distortion. Therefore, the objective of high zoom ratio and good image quality for zoom lenses can be achieved under the low cost and compact size condition.

Although specific embodiments have been illustrated and described, it will be appreciated by those skilled in the art that various modifications may be made without departing from the scope of the present invention, which is intended to be limited solely by the appended claims.

What is claimed is:

1. A zoom lens comprising, in order from an object side to an image-forming side:
   a first lens group having negative refractive power;
   a second lens group having positive refractive power and consisting of, in order from the object side to the image-forming side, three lenses separated from one another and having positive refractive power, positive refractive power, and negative refractive power, respectively, wherein the refractive index of the lens nearest to the object side is NDo, the refractive index of the lens nearest to the image-forming side is NDi, and NDo and NDi satisfy: NDi−NDo>0; and
   a third lens group having positive refractive power;
   wherein an Abbe number of the lens of the second lens group nearest to the object side is VDo, an Abbe number of the lens of the second lens group nearest to the image-forming side is VDi, and VDo and VDi satisfy: VDo−VDi>29.

2. The zoom lens as recited in claim 1, wherein an object surface of the first lens group has a negative radius of curvature.

3. The zoom lens as recited in claim 1, wherein the zoom lens satisfies the following condition: 4.0<ft/fw<7.0, in which fw is a focal length of the zoom lens at the wide-angle end, and ft is a focal length of the zoom lens at the telephoto end.

4. The zoom lens as recited in claim 1, wherein the zoom lens satisfies the following condition: 1.0<|fG1/fG2|, in which fG1 is a focal length of the first lens group, and fG2 is a focal length of the second lens group.

5. The zoom lens as recited in claim 1, wherein the first lens group, the second lens group, and the third lens group respectively comprise at least one aspheric lens or at least one free-form lens.

6. The zoom lens as recited in claim 1, wherein the first lens group, the second lens group, and the third lens group respectively comprise at least one plastic lens.

7. The zoom lens as recited in claim 1, wherein the first lens group comprises, in order from the object side to the image-forming side, a first lens having negative refractive power and a second lens having positive refractive power.

8. The zoom lens as recited in claim 7, wherein the second lens of the first lens group is an aspheric lens or a free-form lens.

9. The zoom lens as recited in claim 7, wherein the first lens of the first lens group is a glass lens, and the second lens of the first lens group is a plastic lens.

10. The zoom lens as recited in claim 1, wherein the second lens group comprises, in order from the object side to the image-forming side, a first lens having positive refractive power, and a second lens having negative refractive power.

11. The zoom lens as recited in claim 10, wherein the first lens and the second lens of the second lens group are two aspheric lenses, two free-form lenses, or one aspheric lens and one free-form lens.

12. The zoom lens as recited in claim 10, wherein the second lens group further comprises a third lens with positive refractive power arranged between the first lens and the second lens.

13. The zoom lens as recited in claim 12, wherein the first lens and the third lens are two glass lenses, and the second lens is a plastic lens.

14. The zoom lens as recited in claim 13, wherein the first lens of the second lens group is a glass lens made by a glass molding process.

15. The zoom lens as recited in claim 1, wherein the third lens group comprises a first lens having positive refractive power.

16. The zoom lens as recited in claim 15, wherein the first lens of the third lens group is an aspheric lens or a free-form lens.

17. The zoom lens as recited in claim 15, wherein the first lens of the third lens group is a plastic lens.

18. The zoom lens as recited in claim 1, further comprising a stop and a filter, wherein the stop is disposed between the first lens group and the second lens group, and the filter is disposed between the third lens group and an image-forming surface of the zoom lens.

19. The zoom lens as recited in claim 1, wherein the first lens group and the second lens group are moved along an optical axis for determining a zoom ratio.

20. A zoom lens comprising, in order from an object side to an image-forming side:
   a first lens group having negative refractive power;
   a second lens group having positive refractive power and consisting of, in order from the object side to the image-forming side, three lenses separated from one another and having positive refractive power, positive refractive power, and negative refractive power, respectively, wherein the refractive index of the lens nearest to the object side is NDo, the refractive index of the lens nearest to the image-forming side is NDi, and NDo and NDi satisfy: NDi−NDo>0; and
   a third lens group having positive refractive power;
   wherein the zoom lens satisfies the following condition:
      $1.0<|fG1/fG2|$, in which fG1 is a focal length of the first lens group, and fG2 is a focal length of the second lens group.

21. A zoom lens comprising, in order from an object side to an image-forming side:
   a first lens group having negative refractive power;
   a second lens group having positive refractive power and consisting of, in order from the object side to the image-forming side, three lenses separated from one another and having positive refractive power, positive refractive power, and negative power, respectively, wherein the refractive index of the first lens nearest to the object side is NDo, the refractive index of the lens nearest to the image-forming side is NDi, and NDo and NDi satisfy: NDi−NDo>0; and
   a third lens group having positive refractive power.

* * * * *